United States Patent
Shepard

(10) Patent No.: US 10,418,005 B2
(45) Date of Patent: Sep. 17, 2019

(54) MULTIMEDIA DISPLAY APPARATUS AND METHOD OF USE THEREOF

(71) Applicant: Robert Shepard, Athens, AL (US)

(72) Inventor: Robert Shepard, Athens, AL (US)

( * ) Notice: Subject to any disclaimer, the term of this patent is extended or adjusted under 35 U.S.C. 154(b) by 46 days.

(21) Appl. No.: 15/791,313

(22) Filed: Oct. 23, 2017

(65) Prior Publication Data
US 2018/0114512 A1 Apr. 26, 2018

Related U.S. Application Data

(60) Provisional application No. 62/410,863, filed on Oct. 21, 2016.

(51) Int. Cl.
| | |
|---|---|
| *G01D 13/02* | (2006.01) |
| *G10D 13/02* | (2006.01) |
| *G10H 1/00* | (2006.01) |
| *G03B 21/14* | (2006.01) |
| *G05G 1/30* | (2008.04) |
| *G10G 1/00* | (2006.01) |

(52) U.S. Cl.
CPC ......... *G10D 13/025* (2013.01); *G03B 21/145* (2013.01); *G05G 1/30* (2013.01); *G10D 13/024* (2013.01); *G10D 13/028* (2013.01); *G10G 1/00* (2013.01); *G10H 1/0008* (2013.01); *G10H 2220/011* (2013.01); *G10H 2230/275* (2013.01)

(58) Field of Classification Search
CPC .. G10D 13/025; G10D 13/024; G10D 13/028; G03B 21/145; G10H 1/0008
See application file for complete search history.

(56) References Cited

U.S. PATENT DOCUMENTS

| | | | | | |
|---|---|---|---|---|---|
| 1,236,667 | A | * | 8/1917 | Bower | G10D 13/025 84/415 |
| 2,574,825 | A | * | 11/1951 | Guild | B62B 1/264 280/47.27 |
| 2,615,662 | A | * | 10/1952 | Sannebeck | G10D 13/026 248/124.2 |
| 2,655,071 | A | * | 10/1953 | Levay | G10D 13/024 84/411 R |
| 3,113,481 | A | * | 12/1963 | Thompson | G10D 13/025 84/415 |
| 3,346,732 | A | * | 10/1967 | Crusius | F21V 33/00 362/86 |
| 3,580,126 | A | | 5/1971 | Forkner | |
| 3,609,339 | A | * | 9/1971 | Smith | G09F 19/18 353/1 |
| 4,285,136 | A | * | 8/1981 | Ragan | G01B 5/255 248/205.1 |

(Continued)

*Primary Examiner* — Robert W Horn
(74) *Attorney, Agent, or Firm* — Patterson Intellectual Property Law, P.C.; Mark A. Kilgore

(57) ABSTRACT

The present disclosure relates, in one embodiment to a multimedia display apparatus. The multimedia display apparatus may comprise a housing which may be connected to a chassis. The chassis may be configured to attach to the underside of a music drum via a biasing element, thereby positioning the housing so as to project a multimedia image onto the head of the music drum. A multimedia projector may be disposed inside the housing and configured to project a multimedia image through the open bottom or transparent surface of the music drum and displayed on the top surface of the white or translucent drumhead.

19 Claims, 4 Drawing Sheets

(56) References Cited

U.S. PATENT DOCUMENTS

| | | | | |
|---|---|---|---|---|
| 4,339,992 | A * | 7/1982 | Kurland | A47J 36/165 366/342 |
| 5,280,742 | A * | 1/1994 | Vergara | F21V 23/04 84/411 R |
| 5,763,797 | A * | 6/1998 | Loendorf | G10D 13/022 84/411 M |
| 5,833,359 | A * | 11/1998 | Hollenbach | B25B 5/16 362/249.1 |
| 5,863,121 | A * | 1/1999 | Dunk | A47J 36/165 366/282 |
| 5,892,169 | A * | 4/1999 | Shapiro | G10D 13/022 84/411 M |
| 5,922,981 | A * | 7/1999 | Ballister | A63J 17/00 84/464 A |
| 6,073,897 | A * | 6/2000 | Warren | F16M 11/105 248/278.1 |
| 6,712,498 | B1 * | 3/2004 | Yang | B01F 13/002 366/282 |
| 7,262,356 | B1 * | 8/2007 | Lukios, II | G10D 13/006 84/411 R |
| 9,279,580 | B2 | 3/2016 | Jargiello | |
| 9,360,206 | B2 | 6/2016 | Hiss | |
| 9,562,552 | B2 * | 2/2017 | Chang | G06F 3/0421 |
| 9,669,323 | B2 | 6/2017 | Raderman | |
| 9,746,753 | B2 * | 8/2017 | Lam | G03B 21/145 |
| 9,788,691 | B1 * | 10/2017 | Bender | A47J 43/07 |
| 9,874,804 | B2 * | 1/2018 | Kinebuchi | F16M 11/00 |
| 9,891,509 | B2 * | 2/2018 | Rossell | F16M 13/022 |
| 10,025,169 | B2 * | 7/2018 | Takasuka | G03B 21/145 |
| 10,126,636 | B1 * | 11/2018 | Heppler | G03B 21/10 |
| 2005/0041221 | A1 * | 2/2005 | Buroni | G03B 21/16 353/119 |
| 2005/0122308 | A1 * | 6/2005 | Bell | G06F 3/011 345/156 |
| 2010/0045947 | A1 * | 2/2010 | Nakanishi | G03B 21/145 353/119 |
| 2013/0048819 | A1 * | 2/2013 | Hung | F16M 11/12 248/286.1 |
| 2014/0198305 | A1 * | 7/2014 | Nakamura | G03B 21/145 353/119 |
| 2015/0060625 | A1 * | 3/2015 | Runger | F16M 11/043 248/324 |
| 2015/0198868 | A1 * | 7/2015 | Sakurai | G03B 21/145 353/119 |
| 2015/0255048 | A1 * | 9/2015 | Moyer | G03B 21/54 84/462 |
| 2017/0178607 | A1 | 6/2017 | Koltun | |
| 2017/0293215 | A1 * | 10/2017 | Clapp | G03B 29/00 |
| 2018/0084921 | A1 * | 3/2018 | Huang | A47C 21/003 |
| 2018/0114512 | A1 * | 4/2018 | Shepard | G10D 13/028 |

* cited by examiner ent or the patent disclosure, as it appears in the
MULTIMEDIA DISPLAY APPARATUS AND METHOD OF USE THEREOF

CROSS-REFERENCES TO RELATED APPLICATIONS

This application claims benefit of the following patent application(s) which is/are hereby incorporated by reference: 62/410,863

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to the use of a projector to display multimedia content. More particularly, the present invention relates to an apparatus for attaching a projector to the underside of a musical drum to allow the projector to display multimedia content onto the head of the drum for use by the drum player.

When playing a musical instrument, it is often necessary for a player to read music, lyrics, and/or other information while performing. Drummers that read music, lyrics, or other information while performing typically use a music stand or a digital tablet device on a stand to hold and store the documents, however it is often difficult to place such a stand or device so a drummer can effectively see the documents. Drum sets require a far greater area of floor space than most other traditional musical instruments such as a guitar, keyboard, violin, trumpet, flute, or other similar string or wind instruments. A typical drum set, with all of its necessary hardware and stands for each drum and cymbal, has very little space left for other accessories such as a music stand.

To overcome this challenge, some setups use a music stand placed adjacent to one or more existing drum, cymbal, or microphone stands. In other setups, the top section of a music stand is utilized without the bottom (base) section where the top portion is typically connected to a positionable arm that may be held by an existing stand or mount used by the drum set. This method avoids having to take up floor space, but still requires air-space to be utilized around the drums, cymbals, and other drum-set hardware. Any time a traditional music stand or positionable arm is used with a drum set, extra space is required, but that extra space may come at the cost of removing or not using other accessories, or the space may simply not be available.

When using music stands or other positionable arms, incidents may occur which cause problems for the drummer to continue to perform. For instance, music stands can be unstable and may fall over causing sheet music, lyrics, or paper to fall to the floor. The drummer will have to continue playing from memory, will need to stop to gather the documents, or will need a third party to gather the documents and replace them on the stand. Likewise, if the stand is holding a digital tablet, a fall may cause severe damage to the tablet itself and render it inoperable for the remainder of the performance. When using a positionable arm, the arm may limit the ability of the drummer to move about the drum set for striking a drum, cymbal, or other hardware.

Additionally, music stands or positionable arms may obstruct the audience's view of the drummer. When positioned in front of the drummer, the audience may not have a full view of the drummer and thus limit the ability to enjoy the performance. When positioned to the side of the drummer, the drummer may be put in an uncomfortable playing position, thus having to turn too far to the right or left while performing. Further, it may become difficult for the drummer to observe other performers in the group to keep up with cues or communication regarding the music or performance. These problems may be made even more complicated when a drummer is using a microphone. The drummer typically will have to face forward to sing or speak into the microphone while also reading music or lyrics. By having a music stand, or arm, as well as a microphone in front of the drummer, it is difficult for the audience to have a clear view. Likewise, when the stand, or arm, is to the side, the arrangement can be uncomfortable and cause neck and shoulder strain effecting the ability of the drummer to perform.

One other method for viewing music, lyrics, or other information, is also used. In this method, a drummer will lay, or tape, a document on to the top of the drum so that the drum itself holds the document. However, this only allows for one sheet of a document, or music, to be held at a time. Further, this method is limited because of the physical size and shape of the drum being used. Finally, while using this method, the document mutes the drum noise when struck, thus limiting or totally restricting the playing of the drum.

What is needed, then, is an apparatus for viewing music, lyrics, or other information that overcomes some of the limitations previously described.

BRIEF SUMMARY OF THE INVENTION

Briefly, the present disclosure relates, in one embodiment, to a multimedia display apparatus. The multimedia display apparatus may include a housing, where a multimedia display may be disposed in the housing. The multimedia display may include a chassis, wherein the chassis may include a planar intermediate portion that is connected to the housing. The chassis may also include a first end that may include at least one first support member, the support member may radially extend at least 90° in a vertical direction from a longitudinal axis of the planar intermediate portion. The chassis may include a second end that may include at least one first support member, the support member may radially extend at least 90° in a vertical direction from a longitudinal axis of the planar intermediate portion. The radial extension of the first and second support member may be configured to arc toward a centerline of the planar intermediate portion, and a biasing element may be configured to bias the first end in a direction toward the second end.

In one embodiment, the multimedia display apparatus may be configured to have a first biasing mode and a second biasing mode. The first biasing mode may extend the first end outwards from the centerline of the planar intermediate portion allowing the apparatus to decouple from an object. The second biasing mode may retract the first end toward the centerline of the planar intermediate portion, allowing the apparatus to couple with the object, wherein in the second biasing mode the multimedia projector may be configured to project an image onto a substrate portion of the object.

In a further embodiment, the chassis may further comprise a first pair of chassis members and a second pair of chassis members. The first pair of chassis members may comprise a first connecting rod having a first diameter and a second connecting rod having a second diameter. The first diameter may be smaller than the second diameter so as to allow the first connecting rod to be inserted into the second connecting rod. The second pair of chassis members may comprise a third connecting rod having a third diameter and a fourth connecting rod having a fourth diameter, the third diameter may be smaller than the fourth diameter so as to allow the third connecting rod to be inserted into the fourth connecting rod.

The chassis may further comprise at least one cross-member connected to at least one connecting rod of the first pair of chassis members and connected to at least one connecting rod of the second pair of chassis members.

The chassis may yet further comprise a first cross-member connected to the first and third connecting rods, and a second cross-member connected to the second and fourth connecting rods. The biasing element may be disposed between the first and second cross-member which may slidably connect the first and third connecting rods to the second and fourth connecting rods.

In another embodiment, the multimedia display apparatus may comprise vibration absorbing material disposed on the chassis. The vibration absorbing material may be chosen from the group consisting of rubber, silicone rubber, polyurethane, polyethylene, neoprene, and the like.

The vibration absorbing material may be disposed on the first end and second end of the chassis.

The vibration absorbing material may be disposed on the planar intermediate portion.

The vibration absorbing material may be disposed between the at least one cross-member and the at least one connecting rod of the first pair of chassis members and the at least one connecting rod of the second pair of chassis members.

In one embodiment, the housing may be rigidly fastened to the first connecting rod and the third connecting rod.

In another embodiment, the housing may be rigidly fastened to the second connecting rod and the fourth connecting rod.

In some embodiments, the housing may comprise an aperture, wherein the multimedia projector may be configured within the housing to project an image through the aperture onto a substrate portion of an object.

The housing may further comprise an optical device disposed in the housing. The optical device may be configured at an angle to direct the image projected by the multimedia projector through the aperture onto the substrate portion of the object.

In one embodiment, the optical device may comprise a mirror.

The optical device may be configured at an angle of 45 degrees in relation to the longitudinal axis of the planar intermediate portion.

In some embodiments, the present disclosure relates to a method of using a multimedia display apparatus. The method may comprise coupling the multimedia display apparatus to an object via a biasing element, turning on a projector to project an image onto a substrate portion of the object, and then decoupling the multimedia display apparatus from the object via the biasing element.

In a further embodiment, the method may comprise controlling the projector via a handheld remote control device.

In another embodiment, the method may comprise controlling the projector via a foot-operated remote control device.

In yet another embodiment, the method may comprise selecting an image to be projected.

DETAILED DESCRIPTION OF THE INVENTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like, should be interpreted to mean any manner of joining two objects including, but not limited to, the use of any fasteners such as screws, nuts and bolts, pin and clevis, one or more sections of hooks and corresponding sections of loops, ribbons, laces, ropes, buttons, and the like, allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

The present invention relates to a multimedia display apparatus 100 that gives a user the ability to project images, texts, video, or other multimedia onto the surface of a music drum head. In one embodiment, images may be projected from below the drum and through the open or transparent surface of the bottom of the drum and viewed on the top surface of the white or translucent drumhead. In some embodiments, the drum may include the tom-tom which faces the user in a position that may easily be seen while performing with the drum set.

Figure 1:
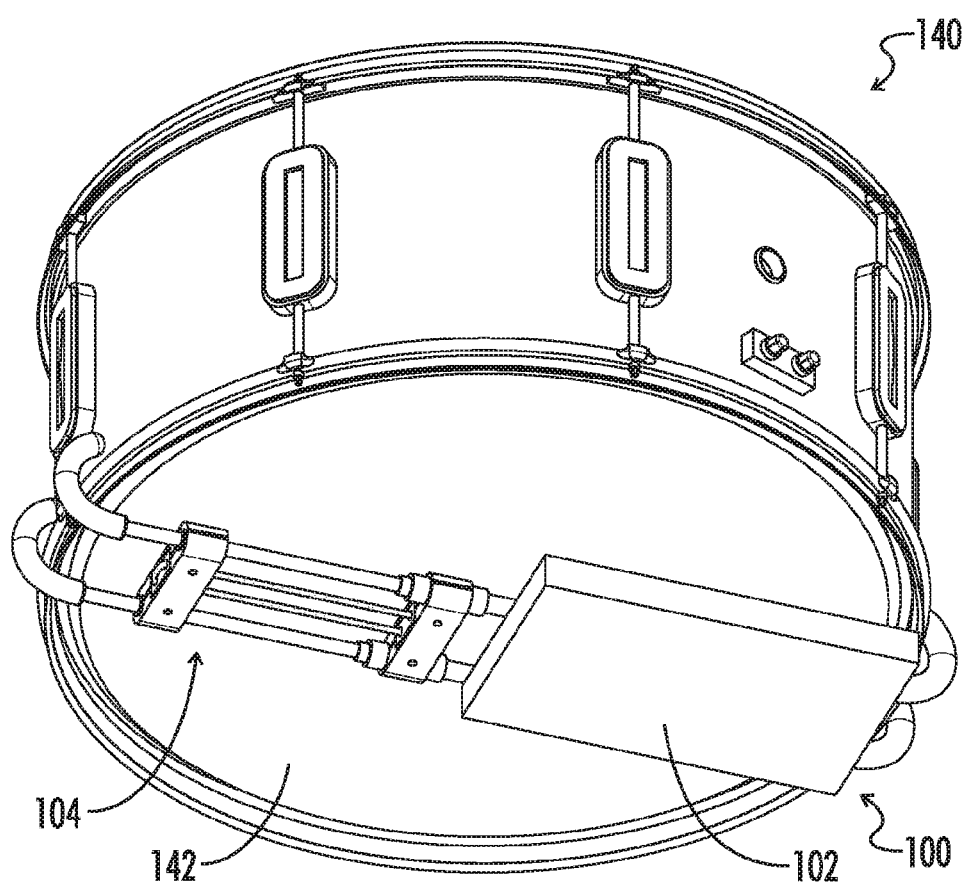
FIG. 1 is a perspective view of a multimedia display apparatus attached to the bottom side of a musical drum.
Figure 2:
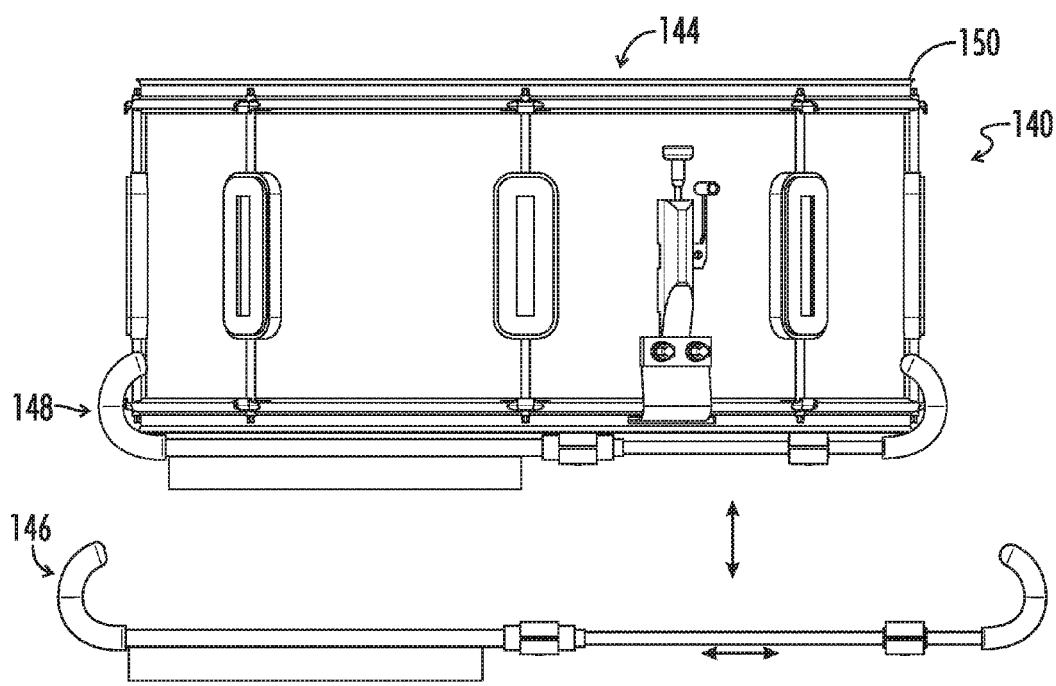
FIG. 2 is a side view of the multimedia display apparatus as shown in FIG. 1, with the apparatus being shown as coupled and decoupled from the musical drum.
Figure 3:
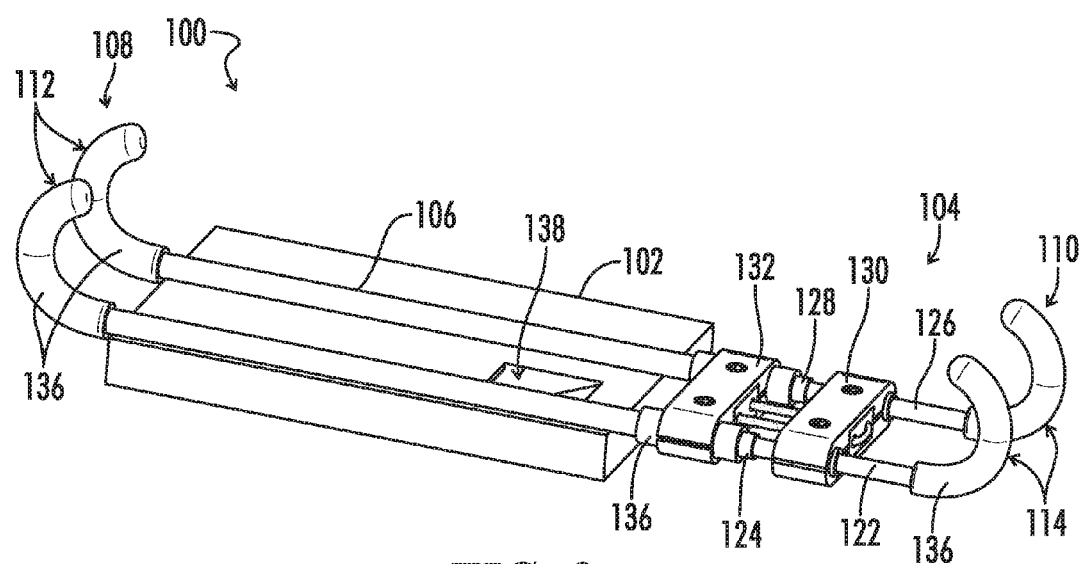
FIG. 3 is a perspective view of the multimedia display apparatus.

Referring initially to FIGS. 1-3, an embodiment of a multimedia display apparatus 100 may comprise a housing 102 which may be connected to a chassis 104. The chassis 104 may be configured to attach to the underside of a music drum 140 via a biasing element 134, thereby positioning the housing 102 so as to project a multimedia image 156 onto the head of the music drum 144. A multimedia projector may be disposed inside the housing 102 and configured to project a multimedia image 156 through the open bottom or transparent surface 142 of the music drum 140 and displayed on the top surface of the white or translucent drumhead 144.

In some embodiments, the chassis 104 may include 3 portions, a first end 108, a planar intermediate portion 106, and a second end 110. The planar intermediate portion 106 may be rigidly connected to the housing 102. The first end 108 may include at least one first support member 112 and the second end 110 may each include at least one second support member 114.

Figure 5:
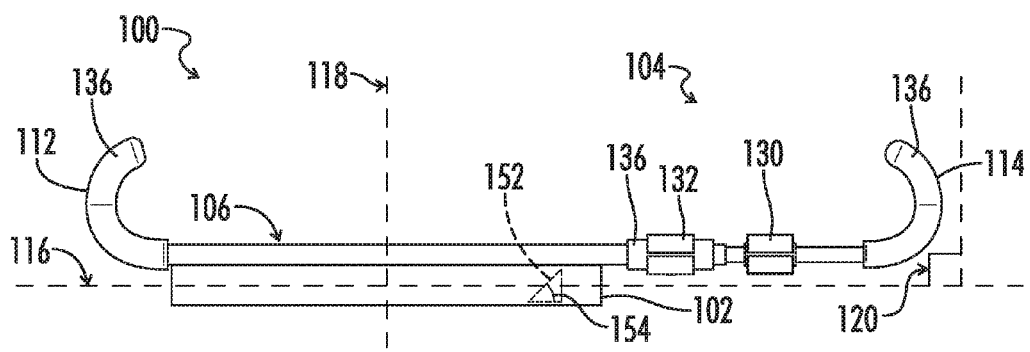
FIG. 5 is a side view of the apparatus as shown in FIG. 3
Figure 6:
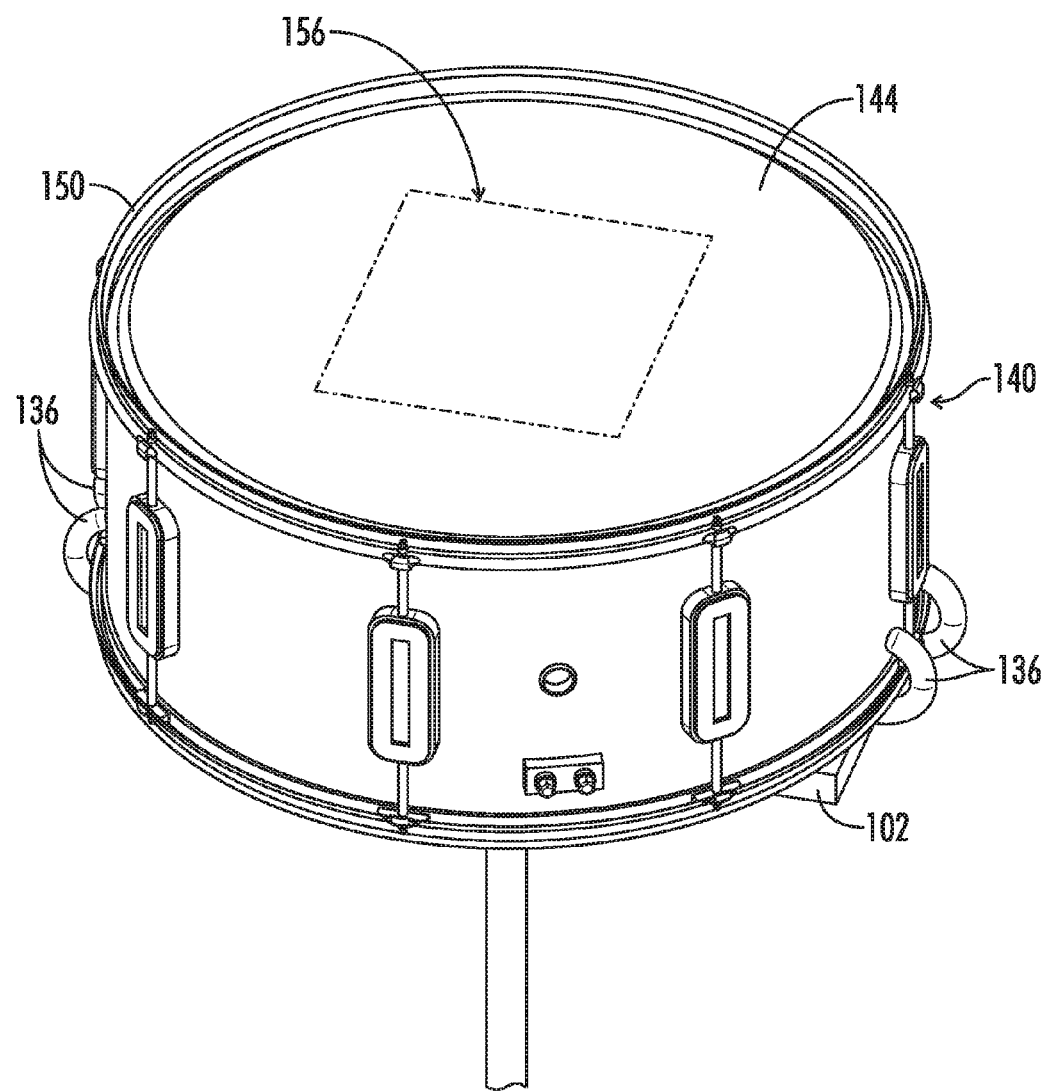
FIG. 6 is a perspective view of a musical drum with an image displayed on the top surface of the drum.

Referring to FIG. 5, each support member 112, 114 may radially extend from a longitudinal axis 116 of the planar intermediate portion 106 at least 90° in a vertical direction 120. The radial extension of each support member 112, 114 may arc toward a centerline 118 of the planar intermediate portion 106. Referring to FIG. 2, the support members 112, 114 facing toward the centerline 118 may create a support structure to allow attachment of the multimedia display apparatus 100 to a music drum 140.

In one embodiment, the planar intermediate portion 106 may include a single element that is connected to the housing 102. In other embodiments, the planar intermediate portion 106 may include dual elements which may be substantially parallel in reference to each other. It will be obvious to one skilled in the art that the planar intermediate portion 106 may vary in length, width, and height, to accommodate various sizes of housings 102 as well as to attach to various sizes of drums 140. The planar intermediate portion 106 may maintain the position of the housing 102 in substantially parallel configuration with the drum head 144 so that the multimedia image 156 may be properly projected onto the drum head and clearly read, seen, or used by the user.

Referring now to FIGS. 2-3, the chassis 104 may comprise a first pair of chassis members 122, 124 and a second pair of chassis members 126, 128. The first pair of chassis members 122, 124 may be comprised of a first connecting rod 122 and a second connecting rod 124, wherein the first connecting rod 122 has a smaller diameter than the second connecting rod 124. Likewise, the second pair of chassis members 126, 128 may be comprised in a similar arrangement, having a third connecting rod 126 and a fourth connecting rod 128, wherein the third connecting rod 126 has a smaller diameter than the fourth connecting rod 128. The first pair 122, 124 and second pair 126, 128 of chassis members may be configured so that the first connecting rod 122 is inserted into the second connecting rod 124 and the third connecting rod 126 is inserted into the fourth connecting rod 128. In a further embodiment, the housing 102 may be connected to the first 122 and third 126 connecting rods. Likewise, in another embodiment, the housing 102 may be connected to the second 124 and fourth 128 connecting rods.

Figure 4:
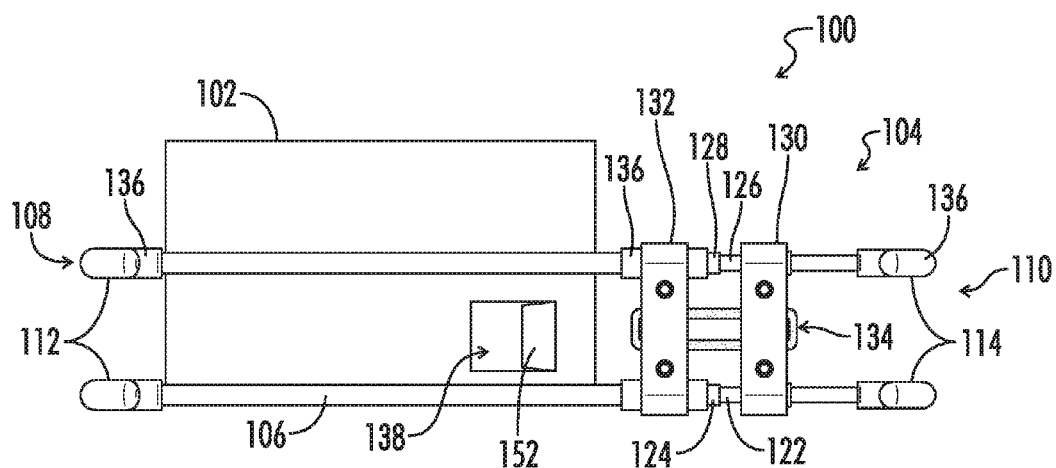
FIG. 4 is a top view of the apparatus as shown in FIG. 3.

Referring to FIGS. 3-4, in one embodiment, the chassis 104 may comprise at least one cross-member 130 connected to at least one connecting rod of the first pair of chassis member 122, 124 and connected to at least one connecting rod of the second pair of chassis members 126, 128. In a further embodiment, the chassis 104 may comprise a first cross-member 130 and second cross-member 132 wherein the first cross member is connected to the first 122 and third 126 connecting rods, and the second cross member is connected to the second 124 and fourth 128 connecting rods.

In some embodiments, the use of cross-members may allow incorporation of a biasing element 134 which may be configured to bias the first end 108 of the chassis toward the second end 110 of the chassis. In the same, and other embodiments, the cross-members may act to stabilize the connecting rods 122, 124, 126, 128 and increase chassis rigidity and support when attached to a music drum 140. In some embodiments the cross-members 130, 132 may be made of metal, aluminum, plastic, polymers, or the like.

In one embodiment, a biasing element 134 may be disposed between the cross-members 130, 132 so that the first end 108 of the chassis is slidably connected to the second end 110. The biasing element 134 may bias the first end 108 toward the centerline 118 thus creating a clamping force which may act to support the multimedia display apparatus 100 when attached to the bottom of a music drum 104. In such a configuration, the first cross-member 130 may be connected to the first 122 and third 126 connecting rods, and the second cross-member 132 may be connected to the second 124 and fourth 128 connecting rods. The second cross-member 132 may configure the second 124 and fourth 128 connecting rods so that both rods may move simultaneously in the same direction and for the same distance. The biasing element 134, when disposed between the cross-members 130, 132, may allow for the movement of the first 122 and third 126 connecting rods in relation to the second 124 and fourth 128 connecting rods. In some embodiments the connecting rods 122, 124, 126, 128 may be made of metal, aluminum, plastic, polymers, or the like.

In some embodiments, the biasing element 134 may be comprised of a coil spring, elastic polymer, hydraulic mechanism, gas strut, ratchet mechanism, and the like. In some embodiments, the length of the chassis 104 may vary as the first end 108 may be moved away from the centerline 118 of the planar intermediate portion 106 by sliding the first 122 and third 126 connecting rods out of the second 124 and fourth 128 connecting rods. Once the first end 108 of the chassis 104 is moved away from the centerline 118, the biasing element 134 may bias the first end back toward the centerline 118 and thus create a clamping force to support the apparatus 100.

Referring now to FIGS. 2-3, in one embodiment, the multimedia display apparatus 100 may be configured to have a first biasing mode 146 and a second biasing mode 148. The first biasing mode 146 may extend the first end 110 outwards from the centerline 118 of the planar intermediate portion 106. The extension of the first end 110 may allow for the apparatus 100 to be decoupled from an object. In some embodiments, the object may include a musical drum 140. The second biasing mode 148 may retract the first end 110 toward the centerline 118 of the planar intermediate portion 106. The retraction of the first end 110 may allow for the apparatus 100 to couple with an object. The apparatus 100 may be positioned so as to allow the multimedia projector to project an image 156 onto a substrate portion of the object. In some embodiments, the object may include a musical drum 140 and the substrate portion may include the top surface 144 of the drum.

In one embodiment, the multimedia display apparatus 100 may be configured to have an elastic biasing mechanism 134 disposed between a first cross-member 130 and a second cross-member 132. In a first biasing configuration 146, the first end 110 of the apparatus 100 may extend outward from the centerline 118 of the planar intermediate portion 106, thus stretching the elastic biasing mechanism 134. The apparatus 100 may then be positioned on the bottom side of a musical drum 140 and configured in the second biasing configuration 148. In the second biasing configuration 148 the elastic biasing mechanism retracts the first end 110 toward the centerline 118 of the planar intermediate portion 106, thus creating a clamping force to support the apparatus 100 against the bottom of the musical drum 140. The apparatus 100 may be positioned so as to allow the multimedia projector to project an image 156 onto the top portion 144 of the drum 140.

Referring to FIGS. 3-5, in one embodiment, the multimedia display apparatus may include vibration absorbing material 136 which is disposed on the chassis 104. When playing a musical drum 140, sound waves are produced from striking the drum head 144 or rim 150, however this also produces vibration that can be transferred through the body of the drum and into any attachments or stands that are connected to the body. In some embodiments, the vibration absorbing material 136 may be preferably disposed on the chassis 104 at various locations which reduce the transfer of vibration to the housing 102 and associated multimedia projector. For example, in one embodiment, the vibration absorbing material 136 may be disposed along the ends of the chassis 108, 110 that include the first 112 and second 114 support members. The support members 112, 114 may contact the base of the drum 140 and transfer any vibration through to the projector, and thus distort the multimedia image being displayed. In another embodiment, vibration absorbing material may be disposed between the cross-members 130, 132 and the connecting rods 122, 124, 126, 128 so as to decrease the transfer of vibration through the cross-members to the projector. In yet another embodiment, vibration absorbing material 136 may be disposed between the housing 102 and the projector to yet further dampen any vibration that is transferred through the drum 140 to the apparatus 100. In some embodiments, the vibration absorbing material 136 may be chosen from rubber, silicone rubber, polyurethane, polyethylene, neoprene, polymers, and the like.

It is further recognized that the material chosen from rubber, silicone rubber, polyurethane, polyethylene, neoprene, polymers, and the like, while acting to dampen vibration associated with playing a musical drum, may also act to protect the drum surfaces from damage. The multimedia display apparatus 100 may be coupled to the drum 140 via the support member 112, 114 contacting the bottom of the drum and being held in place via the biasing mechanism 134. The contact points between the drum 140 and the apparatus 100 may cause damage or wear on the drum surface or the apparatus. The vibration absorbing material 136 may act to protect and cushion the contact points between the apparatus 100 and the drum 140 thereby decreasing the chance of damage to either.

Referring generally to FIG. 3, in one embodiment the housing 102 may be rigidly attached to the chassis 104. The housing 102 may be connected to the second and fourth connecting rods 124, 128 and may be attached through processes known in the art. Preferably, the housing may be attached using an epoxy resin to bind the housing 102 to the chassis 104. The housing 102 may be configured so as to be substantially parallel with the bottom 142 and top 144 drum surfaces. This configuration may allow for the image to be projected onto the top 144 drum surface clearly and easily viewed by the user. In another embodiment, the housing 102 may be connected to the first and third connecting rods 122, 126. Such configuration may generally provide the same result as connecting to the second and fourth connecting rods 124, 128.

In some embodiments, a multimedia projector may be disposed in the housing 102. As an example, a projector that may be used may include the Android D02 DLP Projector. The multimedia projector may be configured to project an image 156 through the open bottom or transparent surface 142 of the drum onto the top surface of the white or translucent drumhead 144. The projector may display a variety of multimedia images 156 including, but not limited to, lyrics, music, videos, pictures, drum lessons, metronomes, song lists, song requests, alerts, messages, logos, advertisement materials, and the like. In addition, the projector may include a speaker system which may be used to play both audio and video media together.

In some embodiments, the housing 102 may comprise vibration absorbing material 136 or other support structure to support and stabilize the projector inside the housing. It will be obvious to those skilled in the art that a variety of projectors may be disposed inside the housing 102. The variety of sizes may require a variety of support structures or material to stabilize the projector and not maintain the correct configuration for projecting images onto the drum surface 144. Further, the use of vibration absorbing material may allow for the further reduction of vibration transferred from the drum 140 to the projector disposed in the housing 102. This reduction may increase the clarity of the image displayed on the drum surface 144.

In some embodiments, the housing 102 may comprise an aperture 138 through which the multimedia projector may project an image 156 onto a substrate portion of an object. In one embodiment, the substrate portion may include the top surface of a drum 144, and the object may include a musical drum instrument 140. In some embodiments the aperture 138 may be located between the second and fourth connecting rods 124, 128. In other embodiments, the aperture 138 may be located between the first and third connecting rods 122, 126. In further embodiments, the aperture 138 may be configured at an appropriate location of the housing 102 to allow the projector to project an image 156 through the aperture onto the top surface of a drum 144.

In some embodiments, an optical device 152 may be disposed in the housing 102. The optical device 152 may be configured at an angle to direct the projected image 156 from the multimedia projector through the aperture 138 onto the substrate portion of the object. In one embodiment, the optical device 152 is configured at an angle between 10 and 90 degrees in relation to the longitudinal axis 116 of the planar intermediate portion 106. In another embodiment, the optical device 152 is configured at an angle between 30 and 70 degrees in relation to the longitudinal axis 116 of the planar intermediate portion 106. In yet further embodiments, the optical device 152 is configured at an angle of 40 degrees in relation to the longitudinal axis 116 of the planar intermediate portion 106.

In a preferred embodiment, the optical device 152 is configured at an angle of 45 degrees 154 in relation to the longitudinal axis 116 of the planar intermediate portion 106. Referring to FIG. 4, the optical device 152 may be configured below the aperture 138 and angled at a 45 degrees 154 relative to the longitudinal axis 116 of the planar intermediate portion 106 to allow the multimedia projector to project an image 156 substantially parallel with the longitudinal axis 116, wherein the projected image may then be directed by the optical device 152 through the aperture 138 and onto the top surface of the drum 144. In one embodiment, the optical device 152 is preferably a mirror. In other embodiments, the optical device 152 may be chosen from the group consisting of a mirror, lens, prism, or other optical object, placed in a configuration which reflects, refracts, dispenses, absorbs, polarizes, or otherwise acts on light. It will be clear to one skilled in the art that the use of an optical device 152 is dependent on the orientation of the multimedia projector and thus, the direction the projected image is directed from the projector. It is clear that a multimedia projector which is able to directly project the multimedia image 156 through the aperture 138 will not need the use of an optical device 152.

In an alternative embodiment, the multimedia display apparatus 100 may be configured to incorporate the bottom rim assembly of a drum 140 as one entire piece. In this embodiment, the bottom rim assembly may be installed so as to create a more permanent attachment configuration of the apparatus 100. This configuration may give the added benefit of not having to couple or decouple the apparatus 100 as often. In a further alternative embodiment, the multimedia display apparatus 100 may be configured so as to be enclosed inside the body of the drum 140.

A method is disclosed as claimed wherein the method comprises coupling the multimedia display apparatus 100 to an object via the biasing element 134. The multimedia display apparatus 100 may include a projector which may be turned on to project an image 156 onto a substrate portion of the object. After use, the multimedia display 100 may be decoupled from the object via the biasing mechanism. In some embodiments, the method may include controlling the projector via a handheld or foot-operated remote control device. The remote control may be wired or wirelessly connected to the projector. In another embodiment, the method may include selecting the subject matter to be projected. In some embodiments, the subject matter may include, but not limited to, lyrics, music, videos, pictures, drum lessons, metronomes, song lists, song requests, alerts, messages, logos, advertisement materials, and the like.

Thus, although there have been described particular embodiments of the present invention of a new and useful MULTIMEDIA DISPLAY APPARATUS AND USE THEREOF it is not intended that such references be construed as limitations upon the scope of this invention except as set forth in the following claims.

What is claimed is:

1. A multimedia display apparatus comprising:
a housing, wherein a multimedia projector is disposed in the housing; and a chassis, the chassis comprising:
a planar intermediate portion, the planar intermediate portion connected to the housing,
a first end, the first end comprising at least one first support member, the at least one first support member radially extending at least 90 degrees in a vertical direction from a longitudinal axis of the planar intermediate portion,
a second end, the second end comprising at least one second support member, the at least one second support member radially extending at least 90 degrees in a vertical direction from the longitudinal axis of the planar intermediate portion, the radial extension of the at least one first and the at least one second support member configured to arc toward a centerline of the planar intermediate portion, and
a biasing element configured to bias the first end in a direction toward the second end.

2. The multimedia display apparatus of claim 1, wherein the apparatus is configured to have a first biasing mode and a second biasing mode, the first biasing mode extends the first end outwards from the centerline of the planar intermediate portion, allowing the apparatus to decouple from an object, the second biasing mode retracts the first end toward the centerline of the planar intermediate portion, allowing the apparatus to couple with the object, wherein in the second biasing mode the multimedia projector is configured to project an image onto a substrate portion of the object.

3. The multimedia display apparatus of claim 1, wherein the chassis further comprises a first pair of chassis members and a second pair of chassis members, the first pair of chassis members comprising a first connecting rod having a first diameter and a second connecting rod having a second diameter, the first diameter being smaller than the second diameter so as to allow the first connecting rod to be inserted into the second connecting rod, and the second pair of chassis members comprising a third connecting rod having a third diameter and a fourth connecting rod having a fourth diameter, the third diameter being smaller than the fourth diameter so as to allow the third connecting rod to be inserted into the fourth connecting rod.

4. The multimedia display apparatus of claim 3, wherein the chassis further comprises at least one cross-member connected to at least one connecting rod of the first pair of chassis members and connected to at least one connecting rod of the second pair of chassis members.

5. The multimedia display apparatus of claim 4, wherein the chassis further comprises a first cross-member connected to the first and third connecting rods, and a second cross-member connected to the second and fourth connecting rods, wherein the biasing element is disposed between the first and second cross-member which slidably connects the first and third connecting rods to the second and fourth connecting rods.

6. The multimedia display apparatus of claim 1, further comprising vibration absorbing material disposed on the chassis, wherein the vibration absorbing material is chosen from the group consisting of rubber, silicone rubber, polyurethane, polyethylene, neoprene, and the like.

7. The multimedia display of claim 6, wherein the vibration absorbing material is disposed on the first end and second end of the chassis.

8. The multimedia display of claim 6, wherein the vibration absorbing material is disposed on the planar intermediate portion.

9. The multimedia display apparatus of claim 4, further comprising vibration absorbing material disposed between the at least one cross-member and the at least one connecting rod of the first pair of chassis members and the at least one connecting rod of the second pair of chassis members.

10. The multimedia display apparatus of claim 3, wherein the housing is rigidly fastened to the first connecting rod and the third connecting rod.

11. The multimedia display apparatus of claim 3, wherein the housing is rigidly fastened to the second connecting rod and the fourth connecting rod.

12. The multimedia display apparatus of claim 1, wherein the housing further comprises an aperture, the multimedia projector configured within the housing to allow the multimedia projector to project an image through the aperture onto a substrate portion of an object.

13. The multimedia display apparatus of claim 12, wherein the housing further comprises an optical device disposed in the housing, the optical device configured at an angle to direct the image projected by the multimedia projector through the aperture onto the substrate portion of the object.

14. The multimedia display apparatus of claim 13, wherein the optical device comprises a mirror.

15. The multimedia display apparatus of claim 13, wherein the optical device is configured at an angle of 45 degrees in relation to the longitudinal axis of the planar intermediate portion.

16. A method of using a multimedia display apparatus, the method comprising:
   (a) coupling the multimedia display apparatus to an exterior portion of a drum body via a biasing element and a plurality of arcuate hooks, the plurality of hooks being biased towards each other;
   (b) turning on a projector to project an image onto a substrate portion of a drum head;
   (c) decoupling the multimedia display apparatus from the exterior portion of the drum body via the biasing element.

17. The method of claim 16, further comprising controlling the projector via a handheld remote control device.

18. The method of claim 16, further comprising controlling the projector via a foot-operated remote control device.

19. The method of claim 16, further comprising selecting a subject matter to be projected.

\* \* \* \* \*